Patented Mar. 7, 1933

1,900,638

UNITED STATES PATENT OFFICE

CARLETON ELLIS, OF MONTCLAIR, NEW JERSEY

COMPOSITION CONTAINING A RESINOUS COMPLEX

No Drawing. Application filed December 17, 1927. Serial No. 240,941.

This invention relates to coating compositions and relates especially to compositions containing resins or balsams derived with the aid of a saturated or substantially saturated fatty acid, specifically the acids derived from animal and vegetable fats and oils.

Among such acids I find stearic acid most readily available. This may be employed in its commercial form, which is usually a mixture of stearic and palmitic acids.

To produce a resinous substance appropriate to the purposes of the present invention various products derived by reaction of glycerol, polyglycerol, and the like, with various organic acids embracing those of the aliphatic and the aromatic series, including both lower and higher fatty acids may be specified.

Thus, stearic acid is heated with phthalic anhydride and glycerol, to give a hard light-colored resin, which may be incorporated with nitrocellulose.

A composition of this character may be made by heating together

| | Parts by weight |
|---|---|
| Stearic acid | 90 |
| Phthalic anhydride | 160 |
| Glycerol | 100 |

The temperature is carried to 240° C. and is held at that point for one hour. A resin obtained in this manner had an acid number of 22.6. It was found to be soluble in toluol and in various mixed solvents for nitrocellulose. When mixed with nitrocellulose in solvents of this character, a lacquer composition resulted which on drying gave a clear transparent film or coating.

Natural resins may be incorporated and reacted to form a resinous complex. Thus ordinary rosin may be employed with stearic acid, phthalic anhydride and glycerol as follows:

| | Parts by weight |
|---|---|
| Stearic acid | 38 |
| Rosin | 33.8 |
| Phthalic anhydride | 67.5 |
| Glycerol | 35.7 |

The above ingredients are heated together and the temperature is raised to 290° C. and held at that point for half an hour. A product obtained in this manner was clear and transparent. The acid number was 40.2 and the resin was fully soluble in lacquer solvents and was compatible with nitrocellulose. It could be heated even longer to harden slightly.

Another illustrative example is as follows:

| | Parts by weight |
|---|---|
| Stearic acid | 71 |
| Toluyl benzoic acid | 120 |
| Glycerol | 23 |

These ingredients are heated together in a receptacle equipped with an air-cooled reflux condenser. Considerable foaming occurs during the heating. In one case it was noted that at 240° C. a considerable amount of acrolein was evolved. This was attributed to the probable presence of aluminum chloride, or compounds thereof in the commercial grade of toluyl benzoic acid which was used.

The final product obtained from the above formula was a brownish amber-colored sticky balsam. In order to obtain the benefit in resinification of a more complicated mixture of raw materials the following composition was prepared:

| | Parts by weight |
|---|---|
| Stearic acid | 14 |
| Fatty acids of cocoanut oil | 14 |
| Rosin | 15 |
| Fused or "run" Congo resin | 15 |
| Phthalic anhydride | 14.8 |
| Succinic acid | 11.8 |
| Glycerol | 3.1 |
| Pentaerythritol | 13.8 |
| Glycol ether ("diethylene glycol") | 5.4 |

This mixture was heated under an air-cooled reflux condenser. The temperature was taken to 290° C. during the period of one hour, and was held at 280–290° C. for an additional hour. The melt then was quickly cooled by pouring out on a cold flat surface.

A soft resin of light amber color resulted. This blended readily with nitrocellulose.

Another resin of a harder character is obtained in the following way:

| | Parts by weight |
|---|---|
| Stearic acid | 45 |
| Fused or "run" Congo resin | 45 |
| Phthalic anhydride | 74 |
| Pentaerythritol | 58 |

The temperature was raised to 290° C. and held at that point for half an hour, yielding hard amber-colored resin. The acid number was 38.6. The resin was soluble in various mixed lacquer solvents, and was very readily blended with nitrocellulose.

Still another composition is the following:

| | Parts by weight |
|---|---|
| Stearic acid | 28 |
| Phthalic anhydride | 15 |
| Benzoyl-benzoic acid | 22 |
| Glycol ether ("diethylene glycol") | 22 |

On heating to 290° C. for half an hour a soft balsam resulted which dissolved in nitrocellulose lacquers.

In lieu of stearic, palmitic, and other similar saturated fat acids, I may employ the corresponding mono- or dihydroxy compounds, or other hydroxylated derivatives, thus, dihydroxy stearic acid may be employed.

| | Parts by weight |
|---|---|
| Dihydroxy stearic acid | 45 |
| Phthalic anhydride | 80 |
| Glycerol | 50 |

The phthalic anhydride compound was of the flake type instead of the crystalline form. The mixture was heated without agitation. A very short air-cooled condenser was attached to the heating receptacle. The temperature was taken to about 245° C. during a period of 20 minutes and was held at that point for half an hour. A fairly hard tough resin of an extremely light color approaching water-whiteness resulted. The acid number was 20.4. The resin was not soluble in xylol, nor in a mixture of xylol and amyl acetate but dissolved freely in a mixture of xylol and the mono-ethyl ether of ethylene glycol. When nitrocellulose was incorporated with this solution a clear water-white film resulted on drying.

| | Parts by weight |
|---|---|
| Dihydroxy stearic acid | 45 |
| Distilled fatty acids of cottonseed oil | 45 |
| Fused and "run" Congo resin | 60 |
| Phthalic anhydride | 160 |
| Glycerol | 100 |

An air-cooled reflux condenser was used in the heating receptacle. The temperature was taken to 250° C. and held for half an hour, the melt then being poured. The acid number was 28.4. The resin is hard and exhibits a light amber color. It is soluble in the usual mixed lacquer solvents, and is compatible with nitrocellulose.

A product which yields a "frosted" finish with nitrocellulose is the following:

| | Parts by weight |
|---|---|
| Stearic acid | 94 |
| Dihydroxy triethyldiether ("triethylene glycol") | 25 |

These ingredients were heated in the presence of a small percentage of aluminum turnings, the temperature being carried to 300° C. in 1½ hours. The product was a hard white solid, with an acid number of 3.5. It was soluble in toluol and in a mixture of toluol and butyl acetate. A composition was made employing nitrocellulose of 4-second viscosity to produce a "frosted" finish.

It should be emphasized that in producing balsams and resins for the purposes of the present invention, it is not necessary in all cases, to heat all the ingredients together simultaneously. The resinification may be carried out in stages during which one or another of the several ingredients are added in any desired order and under temperature conditions specific for the particular orientation of reaction sought for. Thus the following method was employed, using cocoanut oil to supply a saturated or substantially saturated fat acid.

| | Parts by weight |
|---|---|
| Phthalic anhydride | 148 |
| Glycol ether ("diethylene glycol") | 106 |
| Cocoanut oil | 80 |

The glycol ether and phthalic anhydride were first heated to 285° C. which required a period of one hour. A soft balsam of acid number 42.4 was obtained. The cocoanut oil was added thereto and the mixture was heated with agitation. At 270–280° C. the oil entered into apparent combination. A small portion of the mixture when chilled showed some separation, however, hence the temperature was raised to 300° C. and was held at this point for fifteen minutes. A clear transparent homogeneous amber-colored balsam was obtained. The acid number was 27.4. There being a substantial drop in acidity as a result of heating with the cocoanut oil. The balsam was soluble in toluol. It dissolved freely in a nitrocellulose solvent such as a mixture of equal parts of butyl acetate and toluol. With nitrocellulose it proved to be compatible and mixtures of the balsam and nitrocellulose could be made to form compositions adapted for coating and making films.

There may be employed a non-drying oil, or its fatty acid and especially by reacting a substantially or relatively saturated glyceride oil or the free acids thereof, I reduce the tendency to oxidation changes in a coating on long exposure and the stabilization thus effected I consider to be of material benefit. Thus, reactive blown oils or their fatty acids having substantially non-siccative qualities, including the blown derivatives of corn, cottonseed, soya bean, castor, rape and other vegetable (or animal) oils may be used. Blowing to a condition of substantial non-siccativity introduces oxygen at double bonds and thus creates loci of condensation. The present invention includes the employment of such blown oils or their fatty acids used as the sole acid of this type, or in conjunction with stearic acid, hydroxy stearic acid, palmitic acid and other solid fat-acids.

The term fat-acids is used to embrace the group of acids derived from the animal and vegetable fats and oils or natural glycerides and also the derivatives of such acids such as hydroxy stearic acid. The fat-acids therefore constitute a group embraced within the general classification of fatty acids.

Preferably, as stated, I employ one of the solid fat-acids such as stearic acid as the essential component of the resin or balsam and I thus characterize the resins and balsams of the present invention as substantially fat-acid products, in other words, saturated fat-acid resins and balsams. This term includes such products made with the aid of fatty acids in conjunction with the fat acids. Thus, a polyhydric alcohol may be reacted with a fat-acid and another fatty acid forming a resin, which for the purpose of the present invention is designated a fat-acid resin (or balsam). I comprise oil-acids under the term fat-acids. The oil-acids start substantially with lauric acid (12 carbon atoms) and range upward in molecular weight and consequently in the number of carbon atoms. While fat-acids containing 16 to 18 carbon atoms preferably are employed in carrying out the present invention, I may also utilize fat-acids containing a higher number of carbon atoms to make fat-acid resins of corresponding derivation. In the present invention these high carbon acids are restricted substantially to saturated fat-acids or to non-drying acids and to mixtures of such acids, insofar as the essential feature of the product is concerned. I do not, however, wish to limit myself solely to such saturated products, but may under some circumstances as certain of the formulæ above set forth indicate, avail of possible additions of unsaturated fatty acids.

The lower carbon organic acids employed in many cases with the fat-acids in making the resins or balsams are usually of a crystalline character and include a wide range of acid bodies, such as citric, malic, maleic, succinic, tartaric, phthalic, benzoic, salicylic and other acids of a similar nature and their anhydrides.

A typical resin is made from a polyhydric alcohol such as glycerol or glycol with a saturated fat-acid which contains 12 carbon atoms or more and another organic acid which preferably contains less than 12 carbon atoms and may be termed a sub 12 carbon acid.

A type of fat-acid also of a substantially saturated character is that derived by the hydrogenation of various unsaturated animal and vegetable oils. The fat-acids of hydrogenated castor oil may be employed. In a similar manner the fat-acids of other hydrogenated oils or the hydrogenated fats themselves may be used in some cases.

In making a satisfactory coating composition the resin or balsam must be of good solubility in the particular solvent or mixtures of solvents desired. The solvent mixture will depend upon the components of the coating composition. If, for example, glycerol, phthalic anhydride and cottonseed oil are heated together there is great danger that the first two components may react to form an insoluble complex before the cottonseed oil can enter into the reaction. The result is a heterogeneous appearing mass unsuited for use in coating compositions. If a glycol ether ("diethylene glycol") is employed the reaction with the phthalic anhydride does not immediately result in the formation of insoluble bodies and sufficient time of heating and adequate high temperatures may be utilized to allow the oil to enter into combination. The same procedure may be applied in employing the hydrogenated oils.

Nitrocellulose, cellulose acetate, cellulose ethers and other substances serving as hardening and toughening agents for the resins and balsams aforesaid may be employed with the latter.

In the present invention I preferably wish to avail of nitrocellulose of medium and low viscosity. In certain of my copending applications I have described nitrocellulose of a viscosity less than ½ second and have disclosed a method utilizing such low viscosity material, perishable though it normally is, by incorporating with a preservative resin. Also, I have referred frequently in copending applications to the employment of nitrocellulose of ½ second viscosity. Higher viscosities are, however, advantageous with respect to durability and toughening effect. Since I preferably employ a major proportion of the resin to a minor proportion of nitrocellulose, the latter becomes merely a toughening and hardening agent. Instead of a so-called nitrocellulose lacquer in which the nitrocellulose is the prime or essential agent being usually present in major proportion, I normally employ the resin as the pivotal component to which the addition of other substances is made to modify the properties of the resin. Such additions may be the various soluble cellulose compounds as indicated or they may be various oils, natural resins, or other forms of synthetic resins, and so forth.

The invention therefore discloses a new type of coating composition which is not necessarily classed as a nitrocellulose lacquer, even though it may contain some nitrocellulose. My invention in its preferred form contemplates a coating composition intermediate an oil varnish such as spar varnish and the ordinary type of nitrocellulose lacquer. The latter is restricted in many ways due to the limited amount of nitrocellulose which may be introduced. With one application of the ordinary nitrocellulose lacquer a thin film is produced lacking the "fullness" of an oil varnish. By increasing the total solids of the composition in accordance with my invention and by utilizing a larger proportion of the synthetic resin I am enabled to secure a coated effect approaching that of an oil varnish, which may be due to the fact that the resins and balsams described herein are substantially non-siccative, dry as soon as the volatile solvent has evaporated and do not require exposure to the air to bring about slow oxidation and drying characteristic of siccative oils.

Preferably therefore from 2 to 5 parts or higher of the resin are employed to 1 part of nitrocellulose. Preferably also the latter is of a viscosity of 4 seconds and upwards, as for example, falling between the range of 4 seconds and 10 seconds. Nitrocellulose of this range of viscosity contributes materially to the durability of the coating in contradistinction to the somewhat disintegrated nitrocellulose of lower viscosity, for example the ½ second nitrocellulose, now widely used in lacquer manufacture.

It has been supposed that nitrocellulose lacquers to brush readily required the extremely low viscosity material. However, since the bulk of the solid material employed in accordance with the present invention preferably is the synthetic resin, the viscosity of the nitrocellulose may very readily start at 4 seconds and range upward to a considerable degree without negativing the brushing qualities of the coating composition.

In making the new type of coating compositions I may therefore employ simply the resin in solution in a volatile solvent of such a character that the coating may be readily produced by spraying or by brushing, flowing, or in any other suitable manner, or I may toughen the resin by incorporation of a compound of cellulose soluble in organic solvents, particularly nitrocellulose of a medium range of viscosity and I may in such cases add the usual plasticizers, pigments and other substances known to the nitrocellulose lacquer and lacquer enamel industry.

When the coating composition depends upon the resin alone as the sole covering agent the solvents employed may be the cheapest ones suitable for the purpose in hand. Preferably I avoid heavy hydrocarbon solvents as these would be too slow in evaporation and employ the lighter ones such as toluol or mixtures of toluol and light petroleum hydrocarbons, with or without small additions of isopropyl alcohol, butyl alcohol, acetone, higher ketones, ethyl acetate, anhydrous methyl alcohol, anhydrous ethyl alcohol, butyl acetate, and the like. On the other hand since the use of nitrocellulose calls for substantial amounts of the recognized nitrocellulose solvents, I may use the various acetates and other esters, diacetone alcohol, and the like, in suitable proportion to confer appropriate solubility on the nitrocellulose in the manner known to the art.

The foregoing finishing compositions may be applied to metal, wood or other surfaces. Drying, that is, evaporation of the volatile solvents, may be carried out at room temperature or the articles may be placed in an oven and baked at somewhat elevated temperatures to more quickly dry and harden. The resin without a cellulose ester can be baked at higher temperatures than when the cellulose compound is present. A finishing composition containing cellulose acetate can be baked at a temperature somewhat higher than that which contains the nitrate.

In certain specific aspects of the invention which involve nitrocellulose of a limited range of viscosity one phase thereof may be concisely expressed as a coating and film forming composition comprising a synthetic resin and a toughening and hardening agent comprising nitrocellulose ranging from 4 seconds to 10 seconds viscosity, the proportion of the resin being greater than that of the nitrocellulose and the latter being present only in a proportion sufficient to substantially toughen and harden without increasing the viscosity beyond the brushing limit.

Basic substances may be employed in making synthetic resins within the range of the present invention. Urea, for example, is a desirable addition in small or catalytic proportions in making resins from phthalic anhydride, glycerol and the fat-acids of cocoanut oil. The formation of insoluble substances may be largely attributed to the dibasic acid, the phthalic component. Monobasic acids are less likely to cause insoluble substances to form during the heat treatment in making the resin. Therefore as the proportion of monobasic acid is increased the quantity of urea added to prevent the formation of insoluble and infusible compounds may be decreased.

| | Parts by weight |
|---|---|
| Glycerol | 77 |
| Phthalic anhydride | 160 |
| Fat-acids of cocoanut oil | 90 |
| Urea | 0.75 |

On heating to 290° C. for 1¼ hours a hard tough resin was obtained with acid number 52.6. Resins made in this manner are soluble in benzenoid hydrocarbons such as benzol, toluol and solvent naphtha.

A formula indicating in a general way a desirable relationship between the synthetic resin and the cellulose compound such as nitrocellulose is the following:

| | Parts by weight |
|---|---|
| Synthetic resin | 4 |
| Nitrocellulose (viscosity 4 to 10 seconds) | 1 |
| Volatile solvent vehicle | q. s. |
| Pigment | q. s. |

The nature of the volatile solvent vehicle has been indicated in the foregoing and the amount which is used will depend upon requirements, namely; whether a thin or thick coating is required with one application. In any event, when using the synthetic solids of the present invention in high proportion, a brush lacquer can be produced which contains a maximum of total binding and coating solids.

In application 609,136, filed December 26, 1922, there are claimed resins and other condensation products of the polyhydric alcohol-polybasic acid type produced in the presence of inorganic reaction modifying substances, specifically of both acid and alkaline character, which subject matter is disclosed in the instant case but not claimed herein. In companion copending application, Serial No. 709,128, filed April 26, 1924, there are claimed resins and other condensation products of the polyhydric alcohol-polybasic acid type, particularly of low acid number, and also specifically where three component complexes, including a monobasic acid in the complex, and specifically having acid numbers below 60, are claimed, such subject matter being disclosed in the instant case but not claimed broadly herein. In companion copending application, Serial No. 22,882, filed April 13, 1925, there are disclosed and claimed resins of the polyhydric alcohol-polybasic acid type in which ricinoleic acid and the acids generally derived by saponification of castor oil are bound in the resin molecule, as well as such resins produced generally by the use of hydroxylated fatty acids, and particularly the products of low acid number, such condensation products and specifically resins being disclosed in the instant case but not claimed herein. In companion copending application, Serial No. 61,839, filed October 10, 1925, condensation products, and specifically resins are claimed, produced by the use of drying oils and the acids from drying oils bound in the condensation products of the polyhydric alcohol-polybasic acid type, and also where such condensation products include natural resins in such types of condensation products, such resins and condensation products being disclosed in the instant application but not claimed herein broadly. In companion copending application 142,532, filed October 18, 1926, coating compositions are claimed which contain protecting resins broadly, including those produced by the use of the glyceride and related oils and acids from such glyceride oils, such compositions being resistant to exterior exposure, and particularly such coating compositions containing cellulose esters, such as nitrocellulose, in combination with the protecting resins referred to. This companion copending application also claims specifically the polyhydric alcohol-polybasic acid types of resins produced with pentaerythrite. Such subject matter while disclosed in the instant case is not broadly claimed herein. In companion copending application, Serial No. 219,562, filed September 14, 1927, there are claimed resins and other condensation products constituting the reaction complexes of the polyhydric alcohol-polybasic acid type, particularly when produced with glycols and glycol ethers as the polyhydric alcohol ingredient, and also including the fatty acids of non-drying oils bound in the molecule, such complexes being disclosed in but not broadly claimed in the present application. In companion copending application, Serial No. 226,826, filed October 17, 1927, there is claimed resins of the polyhydric alcohol-polybasic acid type that have been modified by treatment with bases, such as urea and other basic materials, such subject matter being disclosed but not claimed in the instant application.

What I claim is:—

1. A coating composition comprising a polyhydric alcohol-organic acid resin containing stearic and cocoanut acids as components.

2. As new compounds, the aliphatic ether-alcohol esters of stearic acid.

3. As new compounds, the diethylene glycol esters of stearic acid.

4. As a new compound, the diethylene glycol ethyl ether ester of stearic acid.

5. A composition of matter containing as an ingredient a diethylene glycol ester of stearic acid.

6. A composition of matter containing as an ingredient the diethylene glycol ethyl ether ester of stearic acid.

7. A synthetic resin, comprising the product of reaction of glycerol with phthalic anhydride, stearic acid, and cocoanut oil acids.

8. A synthetic resin comprising the product of reaction of glycerol with phthalic anhydride, stearic acid, palmitic acid, and cocoanut oil acids.

9. A resin saponifiable by alkali to yield a polyhydric alcohol, a salt of a polybasic organic acid and the soaps of stearic, lauric myristic, and capric acids with minor proportions of the soaps of such other fatty acids as occur in cocoanut oil.

10. The process of preparing a synthetic resin which comprises heating to reaction temperature a mixture containing glycerol, phthalic anhydride, stearic acid, and acids obtained by hydrolysis of cocoanut oil.

11. The process of preparing a synthetic resin which comprises heating to reaction temperature a mixture containing glycerol, phthalic anhydride, stearic acid, palmitic acid, and acids obtained by hydrolysis of cocoanut oil.

12. A coating and film forming composition comprising a solution of a fat-acid resin including a saturated fat acid of 12 or more carbon atoms, an organic acid of less than 12 carbon atoms and glycol, and nitrocellulose.

CARLETON ELLIS.